US010822238B2

(12) United States Patent
Ladislaus et al.

(10) Patent No.: US 10,822,238 B2
(45) Date of Patent: Nov. 3, 2020

(54) APPARATUS AND METHOD FOR BULK PRODUCTION OF ATOMICALLY THIN 2-DIMENSIONAL MATERIALS INCLUDING GRAPHENE

(71) Applicant: THOMAS SWAN & CO. LTD., Consett (GB)

(72) Inventors: Paul Ladislaus, Sedgefield (GB); Lee Glasgow, Consett (GB); Ronan McHale, Newcastle upon Tyne (GB)

(*) Notice: Subject to any disclaimer, the term of this patent is extended or adjusted under 35 U.S.C. 154(b) by 319 days.

(21) Appl. No.: 15/767,972

(22) PCT Filed: Oct. 13, 2016

(86) PCT No.: PCT/GB2016/053177
§ 371 (c)(1),
(2) Date: Apr. 12, 2018

(87) PCT Pub. No.: WO2017/064496
PCT Pub. Date: Apr. 20, 2017

(65) Prior Publication Data
US 2020/0255293 A1 Aug. 13, 2020

(30) Foreign Application Priority Data
Oct. 13, 2015 (GB) ..................................... 1518105

(51) Int. Cl.
*C01B 32/19* (2017.01)
*B32B 43/00* (2006.01)

(52) U.S. Cl.
CPC ............ *C01B 32/19* (2017.08); *B32B 43/006* (2013.01); *C01B 2204/32* (2013.01)

(58) Field of Classification Search
CPC . C01B 32/168; C01B 2202/08; C01B 32/158; C01B 32/159; C01B 32/16;
(Continued)

(56) References Cited

U.S. PATENT DOCUMENTS

| 6,824,086 B1* | 11/2004 | Mazurkiewicz ........ B02C 19/06 |
| | | 241/152.2 |
| 8,585,277 B2* | 11/2013 | Grandi ................... B01F 5/0663 |
| | | 138/46 |
| 2010/0189628 A1* | 7/2010 | Schimpf ................ B82B 3/0076 |
| | | 423/447.2 |

FOREIGN PATENT DOCUMENTS

| EP | 0 034 675 A2 | 9/1981 |
| WO | 2004/052567 A2 | 6/2004 |

(Continued)

OTHER PUBLICATIONS

Nacken, et al., Delamination of graphite in a high pressure homogenizer, RSC Adv. 2015; 5: 57328-57338 (Year: 2015).*

(Continued)

*Primary Examiner* — Daniel C. McCracken
(74) *Attorney, Agent, or Firm* — Brian J. Pangrle

(57) ABSTRACT

An apparatus and method for the production of graphene and similar atomic scale laminar materials by the delamination of a bulk laminar material where the apparatus includes a main pump (112) suitable for pumping a fluid, wherein the fluid includes a solid suspension of particles of the bulk laminar material, at a pressure of greater than 1 MPa, towards and in fluid communication with core components (10) that include a fluid conduit (12) and an impact head (16) that form an annular gap (20) of between 500 µm and 1 µm results between an end of the fluid conduit proximate to the impact head and the impact head and where the gap forms a continuous region surrounding the end of the fluid conduit that is substantially coplanar with the impact head where an impact head surround (26) extends the region in which the fluid is constrained before exiting the core components.

15 Claims, 4 Drawing Sheets

(58) Field of Classification Search
CPC ... C01B 32/162; C01B 32/164; C01B 32/166; C01B 32/17; C01B 32/172; C01B 32/176; C01B 32/178; C01B 2202/00; C01B 2202/02; C01B 2202/04; C01B 2202/06; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D02J 1/04; B82Y 40/00; B82Y 30/00
See application file for complete search history.

(56) References Cited

FOREIGN PATENT DOCUMENTS

| WO | 2012/028724 A1 | 3/2012 |
|---|---|---|
| WO | 2012/117251 A1 | 9/2012 |
| WO | 2013/010211 A1 | 1/2013 |
| WO | 2013/104043 A1 | 7/2013 |
| WO | 2014/140324 A1 | 9/2014 |
| WO | 2015/099378 A1 | 7/2015 |
| WO | 2015/099457 A1 | 7/2015 |
| WO | 2016/174528 A1 | 3/2016 |

OTHER PUBLICATIONS

Nacken et al., Delamination of graphite in a high pressure homogenizer, RSC ADV., vol. 5, No. 71, Jun. 23, 2015, pp. 57328-57338.
Arao et al., Mass production of high-aspect-ratio few-layer-graphene by high-speed laminar flow, Carbon, vo. 102, Feb. 23, 2016, pp. 330-338.
Yi et al., A review on mechanical exfoliation for scalable production of graphene, Mater. Chem. A, 2015, DOI: 10.1039/C5TA00252D (18 pages).

* cited by examiner

APPARATUS AND METHOD FOR BULK PRODUCTION OF ATOMICALLY THIN 2-DIMENSIONAL MATERIALS INCLUDING GRAPHENE

BACKGROUND

Graphene is a two-dimensional allotrope of carbon, consisting of sheets of a few atoms thickness in a hexagonal structure. Analogues of this material can include other chemistries which include boron nitride and molybdenum disulphide.

Graphite, the widely used mineral is effectively a crystalline form of graphene, in which layers of graphene are bound together by van der Waals forces. Graphene has attracted considerable interest since its discovery as an isolatable material in 2004. The novel mechanical, thermal and electrical properties of the material suggest a number of uses. Graphene can be produced on a laboratory scale sufficient for experimental analysis, but production in commercial quantities is still a developing area. Other single layered structures such as boron nitride are expected to exhibit similarly interesting properties in the nanotechnology field.

A review of this technology has been compiled by Min Yi and Zhigang Shen and his titled 'A review on mechanical exfoliation for the scalable production of graphene', Journal of Materials Chemistry, A, 2015, 3, 11700 provides an overview of the state of the art regarding graphene production.

Bottom-up techniques, such as chemical vapour deposition and epitaxial growth, can yield high-quality graphene with a small number of defects. The resultant graphene is a good candidate for electronic devices. However, these thin-film growth techniques suffer from a limited scale and complex and hence expensive production, and cannot meet the requirements of producing industrially relevant quantities of graphene.

Large-scale production of graphene at a low cost has been demonstrated using top-down techniques, whereby graphene is produced through the direct exfoliation of graphite, sometimes suspended in a liquid phase. The starting material for this is three-dimensional graphite, which is separated by mechanical and/or chemical means to reveal graphene sheets a few atoms thick.

The original technique used by the discoverers of graphene, the "Scotch Tape" method can be used to prepare high-quality and large-area graphene flakes. This technique uses adhesive tape to pull successive layers from a sample of graphite. Based on the graphene samples prepared by this method, many outstanding properties of graphene have been discovered. However, this method is extremely labour-intensive and time consuming. It is limited to laboratory research and seems unfeasible to scale up for industrial production.

The three-roll mill technique is a method to scale up the Scotch Tape method, using polyvinyl chloride (PVC) dissolved in dioctylphthalate (DOP) as the adhesive on moving rolls which can provide continuous exfoliation. Though the three-roll mill machine is a known industrial technique, the complete removal of residual PVC and DOP to obtain graphene is not easy and brings about additional complexity.

Prof. Jonathan Coleman's group at Trinity College Dublin have developed a high-yield production of graphene by the sonication assisted liquid-phase exfoliation of graphite in 2008. Starting with graphite powder dispersed in specific organic solvents, followed by sonication and centrifugation, they obtained a graphene dispersion. This method of producing graphene is capable of scaling up but one shortcoming is the extremely low graphene concentration (around 0.01 mg/mL) of the suspension produced, which is not necessarily suitable for bulk production.

Additionally, ultrasonic processors can only achieve the high power density required in small volumes, so it is difficult to scale up this process to achieve any economy of scale. A relevant disclosure can be found in WO2013/010211A1.

Shear Force Techniques.

As is well known, graphite layers have a low resistance to shear force which makes graphite a useful lubricant. This has been exploited in a number of techniques which apply shear force to exfoliate graphene from graphite.

Ball milling, a common technique in the powder industry, is a method of generating shear force. A secondary effect is the collisions or vertical impacts by the balls during rolling actions which can fragment graphene flakes into smaller ones, and sometimes even destroy the crystalline nature of structures.

Several improvements to the ball milling technique have been attempted, such as wet ball milling with the addition of solvents, but these techniques still require a very long processing time (around 30 hours) and produce a high number of defects even if suitable for industrial scale, bulk, production. A relevant disclosure can be found in WO 2012117251 A1.

Some shear force production techniques have used an ion intercalation step prior to applying the shear force to weaken the inter-layer bonds. This reduces the energy required to exfoliate the graphite into graphene, but the resulting graphene may be contaminated with residual ions contaminating the finished product, and the process requires additional time and cost which reduces the industrial application of this technique.

More recently fluid dynamics based methods have emerged for graphite exfoliation. These are based on mixing graphite in a powder or flake form with a fluid to form a suspension, the fluid can then be subjected to turbulent or viscous forces which apply shear stress to the suspended particles. Usually the fluid is a liquid of the type often used as a solvent and may include a surfactant mixture tailored to the removal of the solvent from the finished product.

One method of generating the shear forces is with a high shear, for example rotary mixer. Graphene exfoliation has been demonstrated using a kitchen blender to create shear forces on graphite particles in suspension. This process has been scaled up using commercial high shear mixers comprising rotating blades passing in close proximity to an aperture screen to produce high shear. The graphite particles experience a shear force applied by the fluid due to the difference in velocity of the mixing blades and the static shear screen. A relevant disclosure can be found in WO2012/028724A1 and WO 2014/140324 A1.

A further method is the use of a high pressure homogeniser with a micro fluidiser. The micro fluidiser in this case consist of a channel with a microscale dimension, meaning of around 75 μm. Fluid is forced through the channel from an inlet to an outlet using high pressure. Because of the narrow dimension of the channel, there is a high shear force generated by viscous friction between the walls and the bulk flow which leads to delamination of the graphite. This method requires very high pressures and the starting graphite must already have been comminuted into the micron size range. A relevant disclosure can be found in WO2015/099457.

There exists a need for a graphene production process that can produce graphene using less energy, that can be scaled up to high rates of production without loss of quality of the finished product.

SUMMARY

The present invention relates to a process for producing atomically thin 2-dimensional materials, for example, graphene. In particular, the invention is directed to a simple, scalable process for producing high-quality, defect-free, unoxidised 2-dimensional materials, for example graphene, in commercially useful quantities. Such a material will have applications in composites, coatings, thermal management and electronic devices where properties of electrical conductivity, thermal conductivity, barrier and mechanical strength are of importance.

BRIEF DESCRIPTION OF THE DRAWINGS

Features and advantages of the described implementations can be more readily understood by reference to the following description taken in conjunction with the accompanying drawings.

The apparatus of the present invention will now be illustrated by means of the following figures in which.

DETAILED DESCRIPTION

Figure 1:
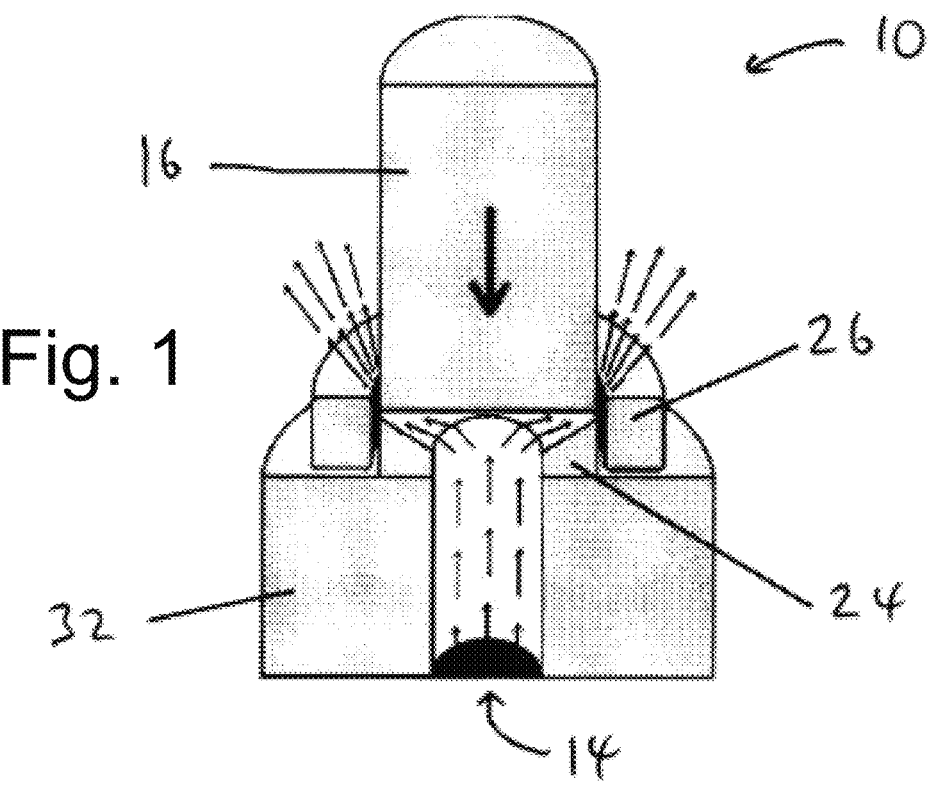
FIG. 1 shows a schematic view of the fluid path through the apparatus of the present invention and illustrates core components.
Figure 2:
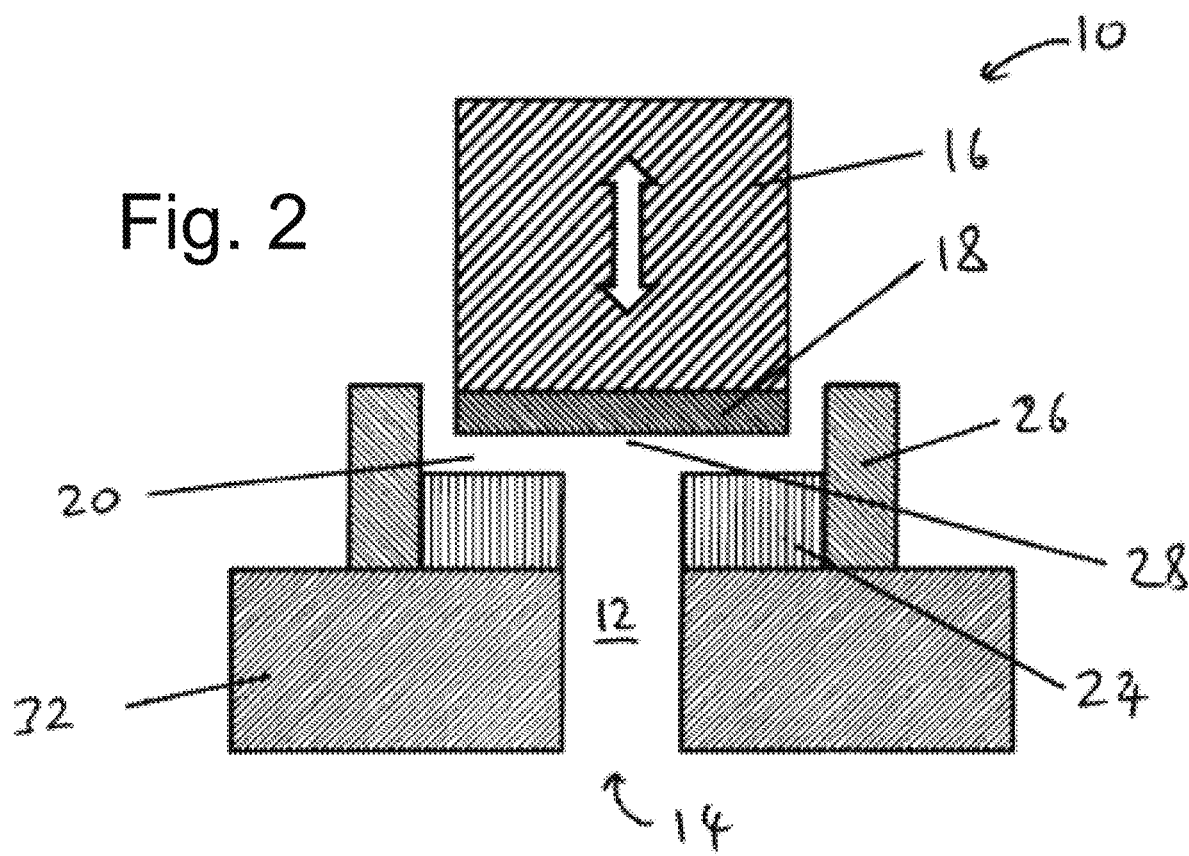
FIG. 2 shows a schematic view in cross-section of a first arrangement of core components of the apparatus of the present invention.

The present invention seeks to overcome the problems in previous techniques to provide a production method for graphene that is rapid, scalable to industrial quantities and energy efficient.

The present invention in its various aspects is as set out in the appended claims.

In a first aspect the present invention provides an apparatus for the production of Graphene and similar atomic scale laminar materials by the delamination of a bulk laminar material, such as graphite; the apparatus comprising:

a main pump suitable for pumping a fluid, the fluid being a solid suspension of particles of the bulk laminar material, at a pressure of greater than 1 MPa, towards and in fluid communication with core components, the core components comprising: a fluid conduit having a principal axis suitable for conveying said fluid, wherein the fluid conduit is arranged to direct fluid from that conduit against; an impact head having a face perpendicular or predominantly perpendicular to said principal axis; the impact head and the conduit being arranged so that an annular gap of between 500 μm and 1 μm results between an end of the conduit proximate to the impact head and the impact head wherein the gap forms a continuous region surrounding the end of the conduit and being substantially coplanar with the impact head; and an impact head surround (26) which extends the region in which the fluid is constrained before exiting the core components.

Preferably, solid particles are particles of graphite, hexagonal boron nitride or molybdenum disulphide. Most preferably the solid particles are graphite.

The fluid may be a suspension of particles in the particle size range 1 μm to 1000 μm.

This apparatus has been found to enable delamination of graphite and similar laminar materials at pressures and energy levels below those required by a micro fluidiser. This has the additional advantage that heat build-up in the process is reduced.

A (substantially) perpendicular arrangement and within a narrow band of pneumatically mediated movement, annular spacing is highly beneficial for providing consistent product. Substantially perpendicular therefore encompasses at most a 10° offset, preferably no more than 1°, most preferably no more than 0.1°. Such an offset may be rendered by a cone so as to provide a symmetrical impact face of the impact head.

In delamination processes high temperature is beneficial as the additional, for example kinetic, energy to separate (exfoliate) a sheet of material, such as graphene is reduced.

We have surprisingly found that production efficiency is inversely proportional to temperature. The apparatus of the present invention, as described above therefore preferably comprises:

a chiller/cooler in fluid communication with said fluid conduit and said pump, the chiller/cooler being configured to reduce the temperature of said fluid, preferably to a temperature less than 10° C. This is particularly advantageous when using a brittle impact head material, such as diamond, silicon nitride, silicon carbide, or cubic boron nitride as cracking and shattering can be reduced. It has been found that the most efficient surface cooling of the impact head is obtained using a diamond impact head face, which appears to offset the brittleness of this material if actively cooled in this way. The material comprising the impact head is preferably present as an impact face to minimise the front-back temperature gradient across the brittle material and so reduce cracking and shattering. The most resistant to cracking without cooling being cubic boron nitride.

To achieve maximum throughput it has been found that the chiller/cooler is preferably supplied by a second, low-pressure, pump in fluid communication with an inlet to the chiller/cooler and the outlet of the chiller/cooler being in fluid communication with the main pump so that the system is configured such that suspension to be processed is first drawn into the second pump, passes through the chiller/cooler and out to the main pump before passing through the conduit to impact upon the impact head before passing through the annulus. For the present application the terms chiller and cooler are considered to be synonyms.

Whilst the apparatus described above has been found to be efficient and is capable of producing up to 8% delamination, such as of graphite to produce graphene in a single pass of fluid through the apparatus it has been found advantageous to recycle said fluid. In this instance it has been found particularly advantageous to recycle back to the inlet of the chiller/cooler, optionally via the second pump.

As mentioned previously low temperatures are advantageous. However, in terms of large-scale production we have found that the optimum temperature range to maintain the fluid is in the range 30° C. to 80° C. as this gives a balance between exfoliation yield per pass and recirculation efficiency. The temperature range is more preferably 35° C. to 50° C. This has been found to give optimal production of graphite in recirculation.

The temperature range of 30° C. to 80° C. has been found preferable for the harder but more brittle impact head materials silicon nitride, silicon carbide, cubic boron nitride and diamond as it gives rise to reduced cracking and chipping of the impact head. To further reduce the risk of cracking and chipping this mode of operation can be preceded by low pressure fluid recirculation (such as using a large gap size and lower flow rate) until the fluid comes homogeneously up to the specified temperature range. The head most resistant to chipping and cracking, and hence preferred is cubic boron nitride. Diamond is also preferred because of its high thermal conductivity. The liquid in which the laminar material is suspended is preferably water. Water is preferable due to its high specific heat capacity which better enables the process to be run in the temperature range of 30° C. to 80° C. This temperature range has been found preferable for the harder but more brittle impact head materials silicon nitride, silicon carbide, cubic boron nitride and diamond as it gives rise to reduced cracking and chipping of the impact head. To further reduce the risk of cracking and chipping this mode of operation can be preceded by low pressure fluid recirculation (such as using a large gap size and lower flow rate) until the fluid comes homogeneously up to the specified temperature range. The head most resistant to chipping and cracking, and hence preferred is cubic boron nitride. Diamond is also preferred because of it high thermal conductivity. The sub range 35° C. to 50° C. is the most optimal in terms of balance of longevity of the impact head when made of brittle materials mentioned as well as consistent product quality and throughput. Cooling to less than 10° C. being prohibitive for large scale production.

The impact head may comprise normal engineering materials, such as steel. This is not surprising since prior art disclosures all use steel or stainless steel apparatus given that graphite and graphene are good lubricants. In particular, graphite has a Hardness (Mohs) of 1-2 and a Hardness (Vickers) of VHN10=7-11 kg/mm$^2$, this in comparison to a conventional steel of Hardness (Mohs) 4-4.5 and for high speed steel VHN10=7-11 kg/mm$^2$. However, we have surprisingly found that harder impact head materials provide potentially greater throughput. Whilst not wishing to be bound by theory is thought that the elasticity of the impact head is lower for harder materials and therefore exfoliation is made more efficient. However, chromium with a Hardness (Mohs) of 8.5 is not necessarily better than steel (for which wear and abrasion with quality graphite has not been an issue) whereas the group tungsten carbide, zirconia, silicon nitride, alumina, silicon carbide, cubic or wurtzite boron nitride and diamond are preferred. In particular, diamond is the most preferred, particularly when the apparatus is used for graphene production. Whilst not wishing to be bound by theory it would appear that the energy of interaction between diamond and graphite, both of course being carbon, materials is the lowest but the difference in crystal structure of diamond and graphite gives rise to the necessary hardness. Further, cubic boron nitride is the effective impact head material for delaminating hexagonal boron nitride, again possibly due to the similarity in surface energy of the materials. Closer approach of the materials possibly giving higher force transfer and hence the better delamination yields.

The apparatus of the present invention has been found to be more efficacious when the impact head is cooled. It is not entirely clear why this is the case as the viscosity of the fluid should be greater at low-temperature. The apparatus of the present invention preferably comprises a cooled impact head, the apparatus is preferably configured to enable the impact head at a flow rate of greater than 1000 l/hr to be maintained at a temperature less than 50° C., preferably less than 25° C., most preferably less than 10° C. It has been found that the most efficient surface cooling of the impact head is obtained using a diamond impact head.

METHOD OF THE INVENTION

In a second aspect the present invention provides a method for exfoliation of laminar materials to produce atomic scale laminar materials by the delamination of bulk material; the method comprises the steps of providing the apparatus hereinbefore described and passing through the apparatus a suspension of laminar material in a liquid.

In the method of the present invention the laminar material is preferably graphite and the atomic scale laminar material is graphene.

The liquid in which the laminar material is suspended is preferably water. Water is preferable due to its high specific heat capacity which better enables the process to be run in the temperature range of 30° C. to 80° C. In addition, the localised head temperature, which as previously mentioned is preferably below room temperature is more easily maintained with water as the liquid. Other suitable liquids are liquid hydrocarbons.

The method of the present invention is preferably operated at a temperature of from 30° C. to 80° C.

The graphite is preferably in the particle size range 1 μm to 1000 μm, more preferably in the particle size range 3 μm to 50 μm, most preferably in the size range 15-25 μm. The size may be determined using a Malvern Mastersizer using the D4,3 particle size measure.

Laminar material, preferably graphite, loading in the liquid phase is preferably in the range from up to 500 grams per litre (g/l), more preferably laminar material loading is 10-125 g/l, most preferably 125 g/l.

The fluid of the present invention is impacted upon the impact head at a pressure of greater than 1 MPa, more preferably at a pressure in the range 10 MPa to 150 MPa still more preferably in the range 40 MPa to 100 MPa, most preferably at a pressure in the range 50 to 70 Mpa. The pressure selection giving an optimised throughput, yield and energy consumption.

It has been surprisingly found that it is not simply a case of the higher the pressure the better, this potentially giving higher impact forces upon the impact head, but that an optimum pressure range is found. This optimum range provides a highest quality of laminate sheet, particularly graphene and molybdenum disulphide. Whilst not wishing to be bound by theory it is considered that unduly high system energies result in breakup of the laminate sheets to small sheets. They also increase the chance of head chipping and shattering of the harder but more brittle head materials. There is therefore an optimum pressure range for a system configured with an impact head such that the solid in the fluid is laminated (exfoliated) whilst the exfoliated laminar sheets are not unduly damaged.

An impact head surround (26) extends the region in which the fluid is constrained before exiting the core components, wherein, the impact face (18) of the impact head comprises material selected from the group tungsten carbide, zirconia, silicon nitride, alumina, silicon carbide, cubic or wurtzite boron nitride and diamond.

an impact head surround (26) which extends the region in which the fluid is constrained before exiting the core components, wherein, the impact face (18) of the impact head comprises material selected from the group tungsten carbide, zirconia, silicon nitride, alumina, silicon carbide, cubic or wurtzite boron nitride and diamond.

The method of the present invention preferably comprises a fluid in which a surfactant is present. Suitable surfactants include sodium alkyl benzene sulphonate and tetra butyl ammonium chloride.

The preferred surfactant is sodium cholate.

The surfactant is preferably an anionic or cationic surfactants which can be neutralised to remove its anionic or cationic character respectively so as to enable facile removal of the surfactant from the fluid. The method of the present invention therefore optionally comprises a neutralisation step of taking the fluid resulting from the method the fluid comprising an anionic or cationic surfactants, that produced fluid comprising laminar sheets of material, preferably graphene, and neutralising said surfactant before washing said surfactant from the sheet of material (which may during this process precipitate), so as to produce a composition consisting of lamina sheets of material in said liquid.

The method of the present invention preferably comprises a filtration step in which particulate material is removed by said filtration step (using whatever mechanism). The filtration step may preferably take place after the neutralisation step.

The present invention also encompasses a further aspect of the use of a high pressure homogeniser, such as of the type disclosed with respect to the drawings, for the production of graphene from graphite in aqueous suspension.

The conditions and parameters relevant to the method of the present invention are also applicable to the configuration of the apparatus of the present invention. Unless mentioned otherwise herein temperatures are at 25° C. and atmospheric pressure is 1 atm.

An impact head material is a material comprising the impact head and need not comprise the whole head but will comprise at least part, preferably all, of the impact face of the impact head.

SPECIFIC DESCRIPTION

The apparatus of the present invention will now be illustrated by means of the figures in which provide the following features:

10 assembly of core components;
12 fluid conduit/volume;
14 entrance to fluid conduit at a point distal from the impact head;
16 impact head assembly;
18 facing (optional) of impact head assembly;
20 annulus;
202 frusto conical annulus;
204 outer annulus;
22 support structure;
24 exit of fluid conduit proximal to the impact head/ proximal end of the conduit;
242 proximal end of the conduit, alternative form;
26 impact head surround;
28 face of the impact head;
32 conduit/pipe;
100 system or (extended) apparatus of the present invention;
110 starting material vessel;
112 high pressure pump;
114 valve;
124 pressure drop valve;
116 finished product vessel;
118 chiller/cooler.

Referring to FIGS. 1 to 4 In use the apparatus of the present invention has fluid pumped from a pump 112 through a fluid conduit 32 having a principal axis, suitable for conveying said fluid in the form of a pipe which terminates as part of the core assembly 10. The core assembly 10 has a proximal end 24 of the pipe 32 in which fluid in the volume of the conduit 12 exits the conduit under pressure so is to impact upon impact head 16; which can have a face of a hardened material 18. When the fluid impacts upon the face of the impact head it then travels through annulus 20 defined between the face of the impact head 28 and the proximal end of the conduit 24 before exiting the core components, such as to be recirculated or to recover it as finished product. In the particular figure a further impact head surround is provided so as to extend the region in which the fluid is constrained before exiting the core components in use. The impact head 16 of the apparatus is configured so as to be preferably movable relative to the proximal end of the conduit 24 and thus definition of an optimal annular gap 20 can be achieved. In particular this enables a large initial gap such as of several mm to be used for machine start-up so as to clear residual debris in the system and to bring the equipment up to a stable operating temperature before establishing the required operating gap specified above. This method improves product quality and consistency.

Figure 3:
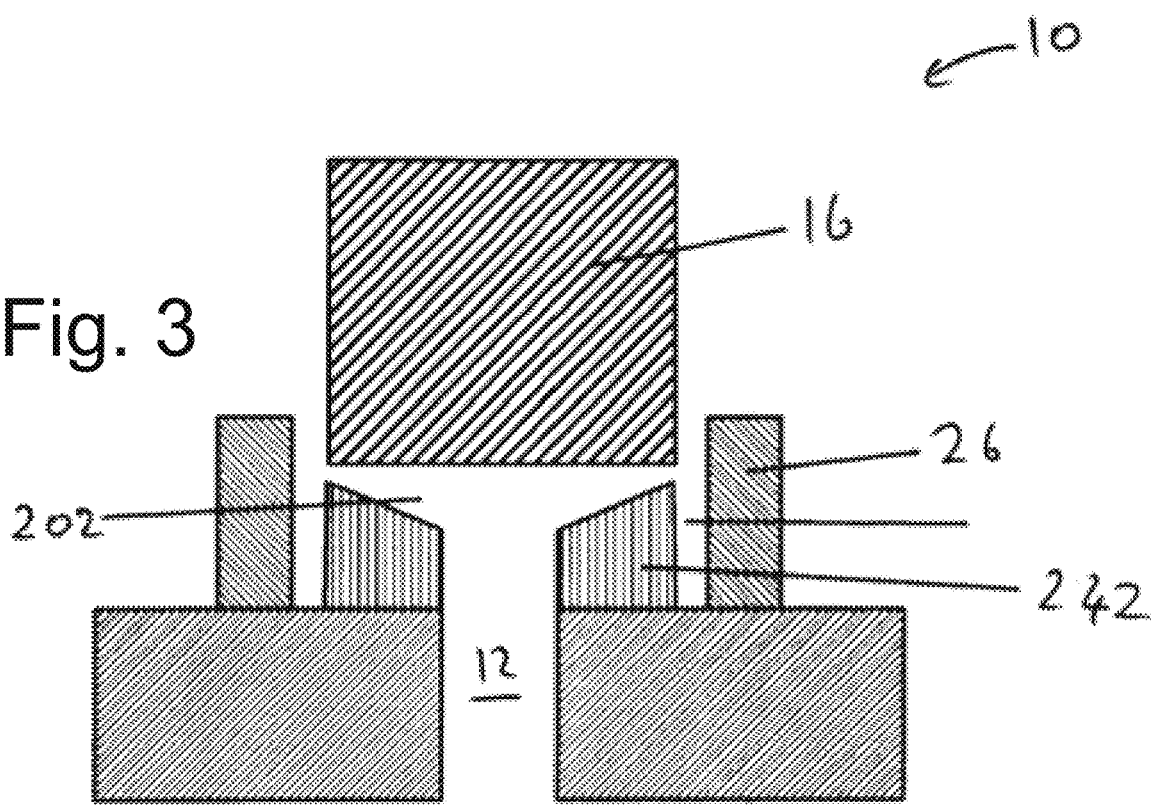
FIG. 3 shows a schematic view in cross-section of a second arrangement of core components of the apparatus of the present invention.

In FIG. 3 the proximal end of the conduit 242 has an internally bevelled face such that in use fluid being transferred from the volume of the conduit 12 through the core components accelerates in the annulus (which is now frusto conical) until a pinch point is arrived at giving maximal shear.

The width of the annular gap is between 500 µm and 200 µm at its widest end, and between 200 µm and 1 µm at its narrowest end.

Figure 4:
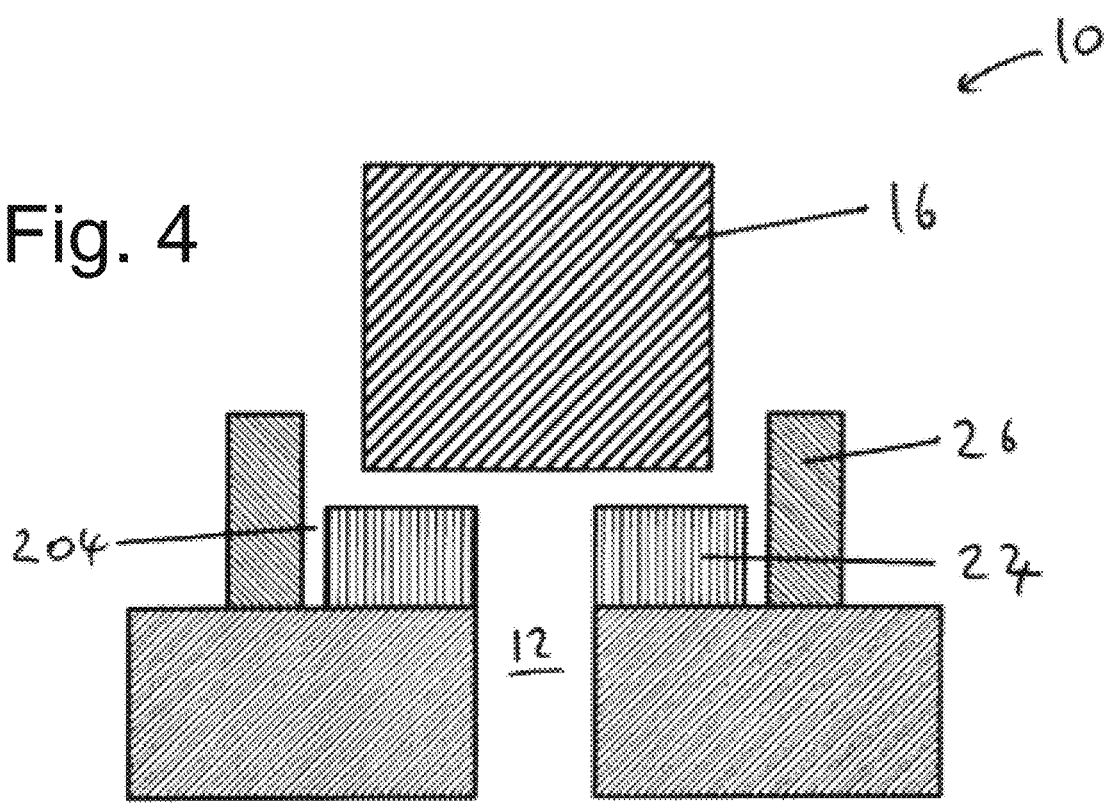
FIG. 4 shows a schematic view in cross-section of a second arrangement of core components of the apparatus of the present invention.

In FIG. 4 the proximal end of the conduit 24 does not abut the impact head surround and provides an outer annulus region 204 in which turbulent flow may occur for improved processing. Specifically, higher delamination can be achieved when using that region. The region also appears to reduce fluid cavitation which increases wear rate on the components. The outer annulus region 204 is presented in FIG. 3 in conjunction with the internally bevelled face but FIG. 3 may be provided without region 204.

Figure 5:
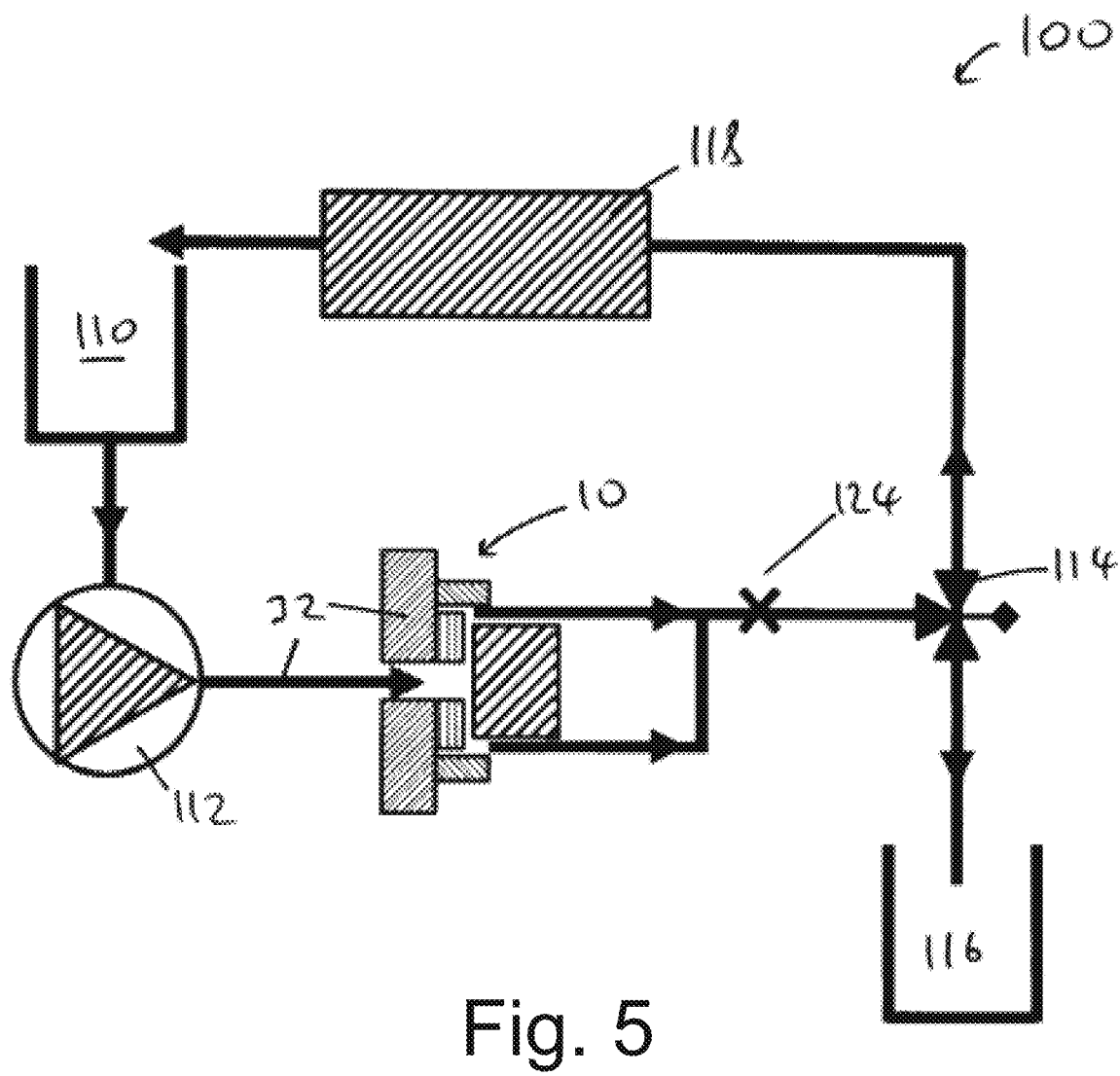
FIG. 5 shows a schematic view of a system or apparatus of the present invention comprising the core components in conjunction with auxiliary components to provide an optimal processing system for performing the method of the present invention.
Figure 6:
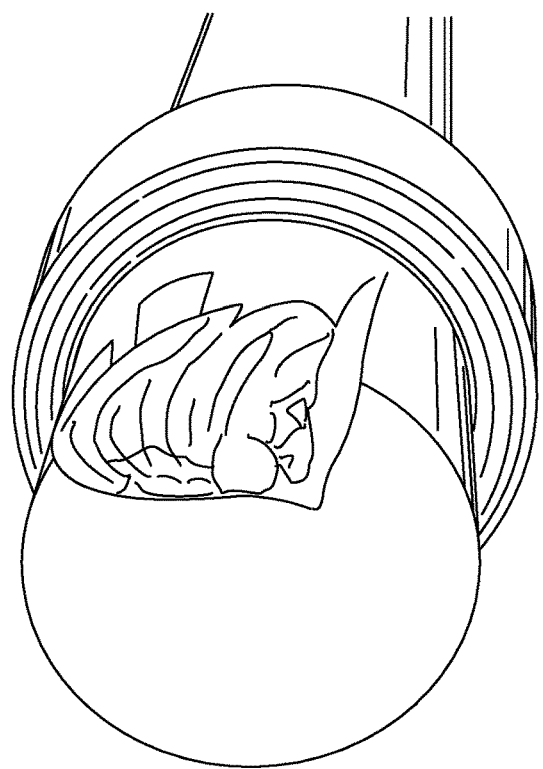
FIG. 6 shows a first view of an example apparatus.
Figure 7:
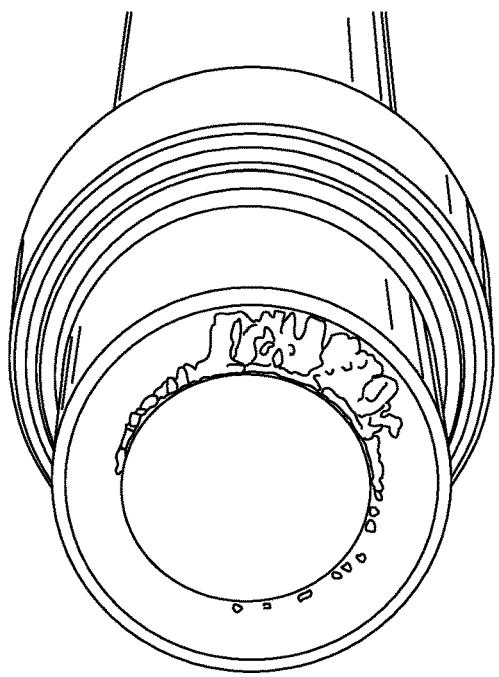
FIG. 7 shows a second view of an example apparatus.

Referring to FIG. 5 a processing system of the present invention comprises core components 10 as previously described. The system is configured so that raw material is provided in vessel 110 and is pumped through high pressure pump 112 into the conduit 12/32 into the core components 10 and in particular the impact head 16 before exiting to optional pressure drop valve 124 so as to provide backpressure to the core components for improved processing. Specifically, maintaining a backpressure, such as from 10 to 100 kPa reduces cavitation of the fluid in the impact head and extends the life of the apparatus. The system is further configured so that fluid then passes through directional control valve 114 either as finished product to product vessel 116 or is recirculated through chiller/cooler 118 before entering high pressure pump 112 for optional recirculation.

An apparatus for the production of Graphene and similar atomic scale laminar materials by the delamination of a bulk laminar material, such as graphite; the apparatus comprising a main pump for pumping a fluid comprising a solid suspension of particles of the bulk laminar material, at a pressure of greater than 1 MPa, towards core components (10) comprising a fluid conduit (12), wherein the fluid conduit directs fluid against an impact head (16); the impact head and the conduit being arranged so that an annular gap (202) of between 500 µm and 1 µm results between an end of the conduit and the impact head, and an impact head surround (26) which extends the region in which the fluid is constrained before exiting the core components.

The present invention describes an apparatus for the production of Graphene and similar atomic scale laminar materials by the delamination of a bulk laminar material, such as graphite. The apparatus comprises a pump which directs fluid against an impact head and through an annular gap of between 500 µm and 1 µm. This causes differential shear forces, causing the bulk material to split into laminar sheets.

The present invention is a production method for graphene that is rapid, scalable to industrial quantities and energy efficient.

It describes an apparatus for the production of Graphene and similar atomic scale laminar materials by the delamination of a bulk laminar material, such as graphite. The apparatus comprises a pump which directs fluid against an impact head and through an annular gap of between 500 µm and 1 µm. This causes differential shear forces, causing the bulk material to split into laminar sheets.

Optimal temperature and pressure ranges are provided, along with techniques that minimise wear and clogging.

The present invention is a production method for graphene that is rapid, scalable to industrial quantities and energy efficient.

It describes an apparatus for the production of Graphene and similar atomic scale laminar materials by the delamination of a bulk laminar material, such as graphite. The apparatus comprises a pump which directs fluid against an impact head and through an annular gap of between 500 µm and 1 µm. This causes differential shear forces, causing the bulk material to split into laminar sheets.

Optimal temperature and pressure ranges are provided, along with techniques that minimise wear and clogging.

The invention claimed is:

1. An apparatus for production of atomic scale laminar materials by delamination of a bulk laminar material, the apparatus comprising:
   a main pump for pumping a fluid, wherein the fluid comprises a suspension of particles of the bulk laminar material, at a pressure of greater than 1 MPa, towards and in fluid communication with core components, wherein the core components comprise:
   a fluid conduit having a principal axis for conveying the fluid, wherein the fluid conduit is arranged to direct fluid from the fluid conduit against;
   an impact head having a face substantially perpendicular to the principal axis wherein, the impact head and the fluid conduit are arranged so that an annular gap of between 500 µm and 1 µm results between an end of the fluid conduit proximate to the impact head and the impact head and wherein the annular gap forms a continuous region surrounding the end of the fluid conduit that is substantially coplanar with the impact head; and
   an impact head surround which extends the continuous region in which the fluid is constrained before exiting the core components.

2. The apparatus of claim 1, further comprising a pressure drop valve after the impact head to provide backpressure.

3. The apparatus of claim 1, wherein the impact head of the apparatus is configured to be movable along the principal axis relative to the proximal end of the fluid conduit for adjusting the annular gap.

4. The apparatus of claim 1, wherein the proximal end of the fluid conduit does not abut the impact head surround and provides an outer annulus region.

5. The apparatus of claim 1, further comprising a cooler in fluid communication with the fluid conduit and the main pump, such that the suspension of particles to be processed will pass through the cooler and out to the main pump before passing through the core components, the cooler being configured to reduce the temperature of the fluid.

6. The apparatus of claim 1, wherein the impact head comprises at least one material selected from the group consisting of silicon nitride, tungsten carbide, silicon carbide, boron nitride, alumina, zirconia and diamond.

7. A method for exfoliation of a laminar material to produce an atomic scale laminar material by delamination of a bulk laminar material, the method comprising:
   providing the apparatus of claim 1 and;
   passing through the apparatus a fluid comprising a suspension of particles of the bulk laminar material.

8. The apparatus of claim 5, further comprising a conduit configured to to recycle at least a portion of the fluid back to the inlet of the main pump optionally via the cooler.

9. The method of claim 7, wherein the temperature of the fluid is maintained in a range from 30° C. to 80° C.

10. The method of claim 7, wherein the fluid is impacted upon the impact head at a pressure in a range from 10 MPa to 150 MPa.

11. The method of claim 7, wherein the bulk laminar material is graphite and the atomic scale laminar material is graphene.

12. The method of claim 7, wherein the fluid comprises a liquid in which the bulk laminar material is suspended as the suspension particles and wherein the liquid comprises water.

13. The method of claim 7, wherein the particles are in a size range from 1 µm to 1000 µm.

14. The method of claim 7, wherein the bulk laminar material loading is from 10 g/l to 125 g/l.

15. The method of claim 7, wherein the atomic scale laminar material is graphene.

* * * * *